US012456309B2

(12) United States Patent
Lin et al.

(10) Patent No.: US 12,456,309 B2
(45) Date of Patent: Oct. 28, 2025

(54) MITIGATION STRATEGIES FOR LANE MARKING MISDETECTION

(71) Applicant: GM Global Technology Operations LLC, Detroit, MI (US)

(72) Inventors: Wen-Chiao Lin, Rochester Hills, MI (US); Zhongyu Yang, Farmington Hills, MI (US); Xinyu Du, Oakland Township, MI (US); Yao Hu, Sterling Heights, MI (US); Shengbing Jiang, Rochester Hills, MI (US); Yilu Zhang, Northville, MI (US); Sidi Lu, Detroit, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 810 days.

(21) Appl. No.: 17/740,625

(22) Filed: May 10, 2022

(65) Prior Publication Data
US 2023/0368547 A1 Nov. 16, 2023

(51) Int. Cl.
*G06V 20/56* (2022.01)
*B60W 40/06* (2012.01)

(52) U.S. Cl.
CPC ......... *G06V 20/588* (2022.01); *B60W 40/06* (2013.01); *B60W 2420/403* (2013.01); *B60W 2552/53* (2020.02)

(58) Field of Classification Search
CPC ...... G06V 20/588; G06V 10/26; G06V 10/82; G06V 20/52; B60W 40/06; B60W 2420/403; B60W 2552/53; B60W 30/12; B60W 50/14; G06T 7/0002; G06T 2207/20081; G06T 2207/20084
See application file for complete search history.

(56) References Cited

U.S. PATENT DOCUMENTS

| | | | | |
|---|---|---|---|---|
| 8,676,492 B2* | 3/2014 | Litkouhi | ................ | G01C 21/26 701/409 |
| 11,851,073 B2* | 12/2023 | Lin | ................ | B60W 50/02 |
| 2010/0097457 A1* | 4/2010 | Zhang | ................ | G06V 20/58 348/119 |
| 2010/0104199 A1* | 4/2010 | Zhang | ................ | G08G 1/166 382/199 |
| 2015/0203076 A1* | 7/2015 | Irie | ................ | G02B 27/0006 15/319 |
| 2018/0365858 A1* | 12/2018 | Kim | ................ | G06T 7/13 |
| 2019/0066512 A1* | 2/2019 | Liu | ................ | G06V 20/588 |
| 2020/0026282 A1* | 1/2020 | Choe | ................ | G05D 1/0257 |
| 2020/0207363 A1* | 7/2020 | Deshpande | ....... | B60W 50/0098 |
| 2021/0157330 A1* | 5/2021 | Tran | ................ | G06V 10/82 |
| 2021/0287018 A1* | 9/2021 | Yoo | ................ | G06V 20/588 |
| 2022/0221301 A1* | 7/2022 | Nagappan | ............. | B60W 10/18 |
| 2023/0192103 A1* | 6/2023 | Lin | ................ | B60W 50/02 701/23 |
| 2023/0408284 A1* | 12/2023 | Liu | ................ | G01C 21/3658 |

* cited by examiner

Primary Examiner — Bobbak Safaipour
(74) Attorney, Agent, or Firm — CANTOR COLBURN LLP

(57) ABSTRACT

A vehicle, and a system and method of navigating the vehicle. The system includes a camera and a processor. The camera obtains an image of a road upon which the vehicle is moving. The processor is configured to extract a feature of the road from the image, perform a lane detection algorithm to detect a set of lane markers in the road using the image and the feature, and move the vehicle along the road by tracking the set of lane markers.

20 Claims, 14 Drawing Sheets

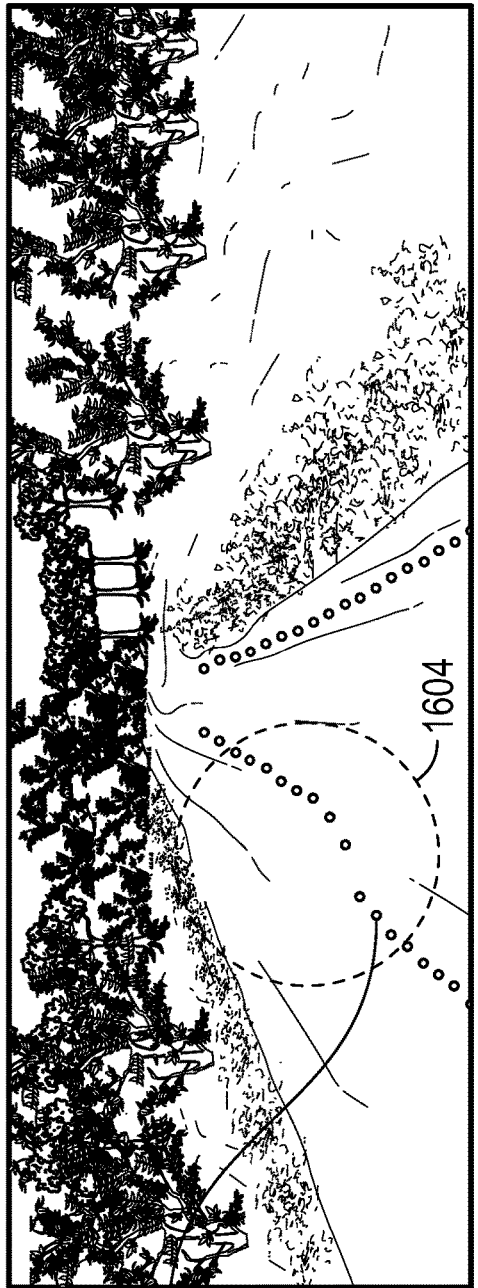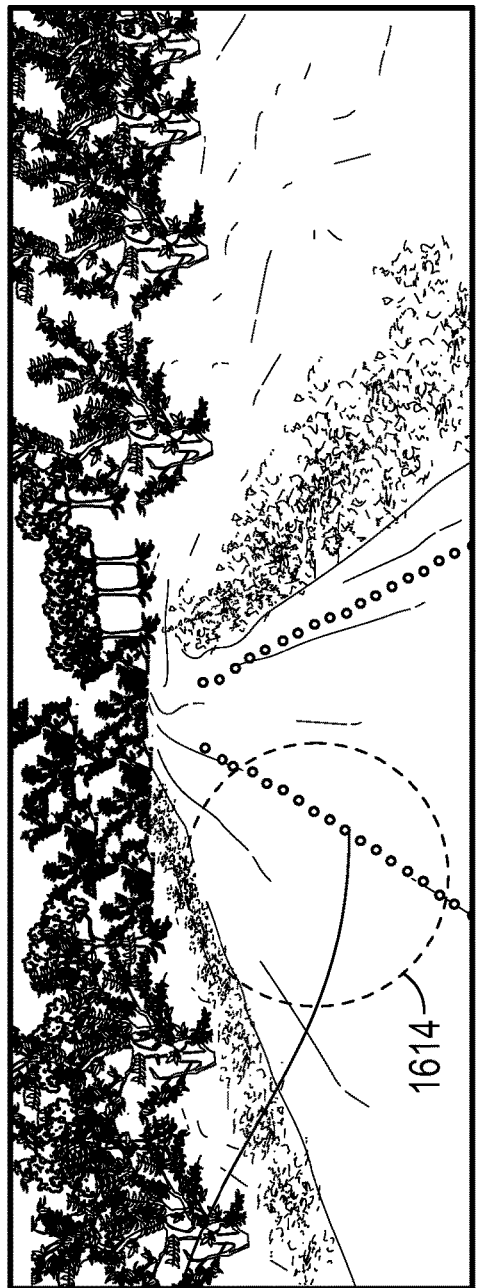

MITIGATION STRATEGIES FOR LANE MARKING MISDETECTION

INTRODUCTION

The subject disclosure relates to lane detection in autonomous vehicles and, in particular, to a system and method for detecting lane markings in harsh or unfavorable environmental conditions.

Autonomous vehicles detect lane markings in a roadway in order to navigate the roadway without diverging into other lanes. In good environmental conditions, lane detection can be performed by taking an image of the roadway using a camera and identifying the lane markings in the roadway using suitable algorithms. However, deteriorated environmental conditions can make it difficult to detect lane markings within the image using this method. For example, night or dark conditions yields dim images, and snow or heavy rain can obscure the lane markings on the roadway. Accordingly, it is desirable to provide a method for detecting lane markings in a roadway in unfavorable environmental conditions.

SUMMARY

In one exemplary embodiment, a method of navigating a vehicle is disclosed. An image is obtained at a camera on the vehicle of a road upon which the vehicle is moving. A feature of the road is extracted from the image. A lane detection algorithm is performed to detect a set of lane markers in the road using the image and the feature. The vehicle is moved along the road by tracking the set of lane markers.

In addition to one or more of the features described herein, the feature further includes a road segmentation information. The feature further includes a trajectory of a road agent on the road. The method further includes displaying at a monitor the set of lane markers to a driver of the vehicle. The method further includes at least one of sending the image to a lane detection module and sending the image to both the lane detection module and an information extraction module. The method further includes obtaining a first set of marker points by sending the image to the lane detection module and a second set of marker points by sending the image to both the lane detection module and the information extraction module and selecting a final set of marker points from the first set of marker points and the second set of marker points. The method further includes determining a first confidence value for the first set of marker points and a second confidence value for the second set of marker points and selecting the final set of marker points using the first confidence value and the second confidence value.

In another exemplary embodiment, a system for navigating a vehicle is disclosed. The system includes a camera and a processor. The camera obtains an image of a road upon which the vehicle is moving. The processor is configured to extract a feature of the road from the image, perform a lane detection algorithm to detect a set of lane markers in the road using the image and the feature, and move the vehicle along the road by tracking the set of lane markers.

In addition to one or more of the features described herein, the feature further includes a road segmentation information. The feature further includes a trajectory of a road agent on the road. The processor is further configured to display the set of lane markers to a driver of the vehicle at a monitor. The processor is further configured to perform at least one of send the image to a lane detection module and send the image to both the lane detection module and an information extraction module. The processor is further configured to obtain a first set of marker points by sending the image to the lane detection module and a second set of marker points by sending the image to both the lane detection module and the information extraction module and select a final set of marker points from the first set of marker points and the second set of marker points. The processor is further configured to determine a first confidence value for the first set of marker points and a second confidence value for the second set of marker points and select the final set of marker points using the first confidence value and the second confidence value.

In another exemplary embodiment, a vehicle is disclosed. The vehicle includes a camera and a processor. The camera obtains an image of a road upon which the vehicle is moving. The processor is configured to extract a feature of the road from the image, perform a lane detection algorithm to detect a set of lane markers in the road using the image and the feature, and move the vehicle along the road by tracking the set of lane markers.

In addition to one or more of the features described herein, the feature further includes at least one of a road segmentation information and a trajectory of a road agent on the road. The processor is further configured to display the set of lane markers to a driver of the vehicle at a monitor. The processor is further configured to perform at least one of sending the image to a lane detection module and sending the image to both the lane detection module and an information extraction module. The processor is further configured to obtain a first set of marker points by sending the image to the lane detection module and a second set of marker points by sending the image to both the lane detection module and the information extraction module and select a final set of marker points from the first set of marker points and the second set of marker points. The processor is further configured to determine a first confidence value for the first set of marker points and a second confidence value for the second set of marker points and select the final set of marker points using the first confidence value and the second confidence value.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIGS. 16A and 16B illustrate the effects of road segmentation data on improving lane detection results.

DETAILED DESCRIPTION

Figure 1:
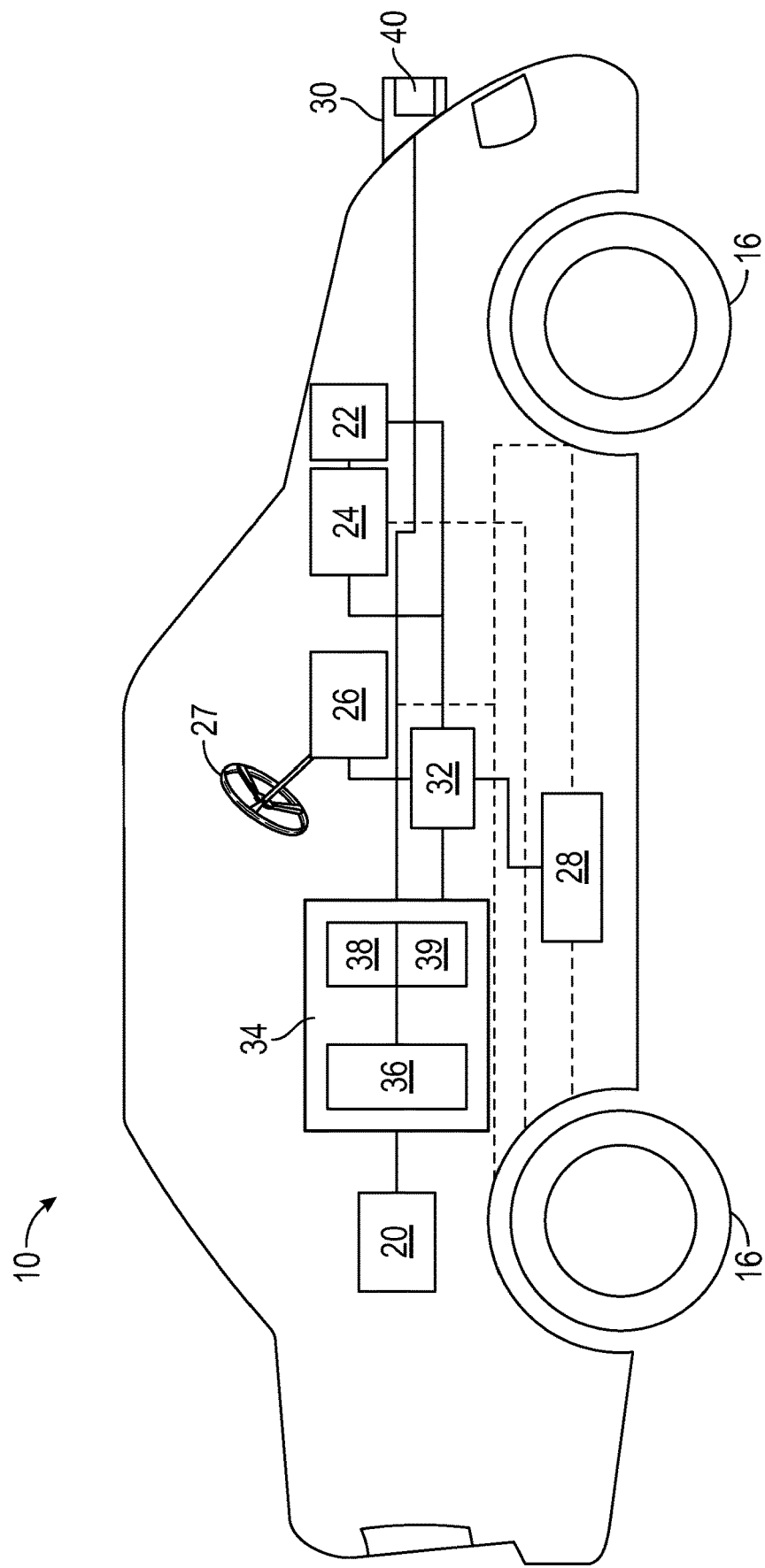
FIG. 1 shows a vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, FIG. 1 shows a vehicle 10. In various embodiments, the vehicle 10 can be a non-autonomous vehicle or an autonomous vehicle. An autonomous vehicle can be a so-called Level Four or Level Five automation system. A Level Four system indicates "high automation," referring to the driving mode-specific performance by an automated driving system of all aspects of the dynamic driving task, even if a human driver does not respond appropriately to a request to intervene. A Level Five system indicates "full automation," referring to the full-time performance by an automated driving system of all aspects of the dynamic driving task under all roadway and environmental conditions that can be managed by a human driver. It is to be understood that the system and methods disclosed herein can also be used with an autonomous vehicle operating at any of Levels One through Five.

The autonomous vehicle generally includes at least a navigation system 20, a propulsion system 22, a transmission system 24, a steering system 26, a brake system 28, a sensor system 30, an actuator system 32, and a controller 34. The navigation system 20 determines a road-level route plan for automated driving of the autonomous vehicle. The propulsion system 22 provides power for creating a motive force for the autonomous vehicle and can, in various embodiments, include an internal combustion engine, an electric machine such as a traction motor, and/or a fuel cell propulsion system. The transmission system 24 is configured to transmit power from the propulsion system 22 to two or more wheels 16 of the autonomous vehicle according to selectable speed ratios. The steering system 26 influences a position of the two or more wheels 16. While depicted as including a steering wheel 27 for illustrative purposes, in some embodiments contemplated within the scope of the present disclosure, the steering system 26 may not include a steering wheel 27. The brake system 28 is configured to provide braking torque to the two or more wheels 16.

The sensor system 30 includes a camera 40 that captures an image of an area surrounding the environment, such as a roadway in front of the autonomous vehicle. The camera 40 can be a digital camera having an array of photodetectors for capturing an image. Each photodetector can record an intensity of red, green, or blue light in an area of the image. In other embodiments, the camera 40 can be a video camera that captures video of the roadway while the autonomous vehicle is travelling over the roadway, using the array of photodetectors. The sensor system 30 can include additional sensors, such as radar, Lidar, etc.

The controller 34 builds a trajectory for the autonomous vehicle based on the output of sensor system 30. The controller 34 can provide the trajectory to the actuator system 32 to control the propulsion system 22, transmission system 24, steering system 26, and/or brake system 28 in order to navigate the autonomous vehicle with respect to the various road agents, wherein a road agent can be a road vehicle other than the vehicle 10 and is generally a nearby vehicle.

The controller 34 includes a processor 36 and a computer readable storage device or computer readable storage medium 38. The computer readable storage medium 38 includes programs or instructions 39 that, when executed by the processor 36, operate the autonomous vehicle based on sensor system outputs. In various embodiments, the processor 36 uses extra road information in combination with lane detection methods to improve the ability of the lane detection methods in locating the lane markings.

Figure 2:
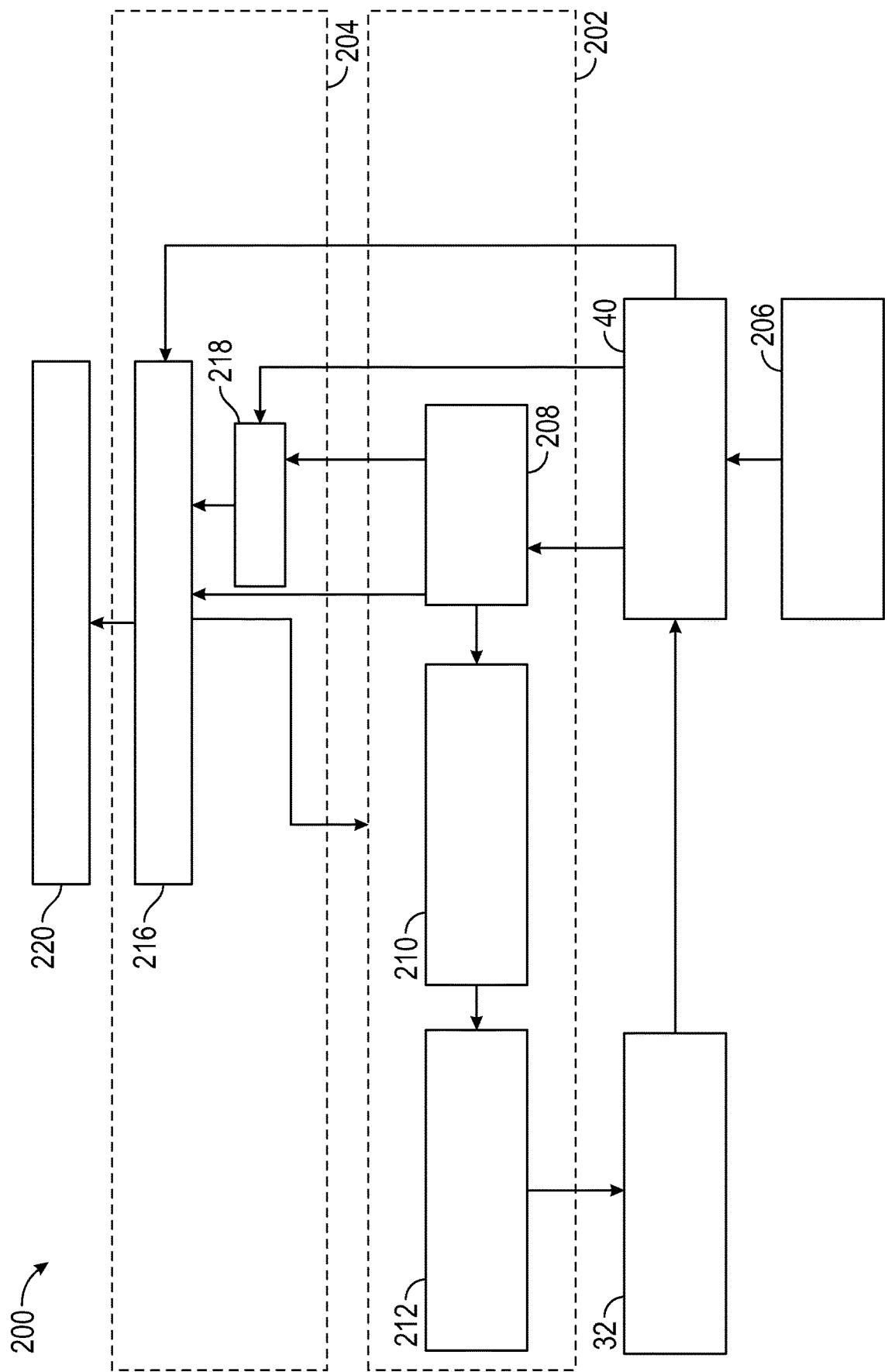
FIG. 2 shows a schematic diagram of a lane detection system for identifying lane markers under several conditions.

FIG. 2 shows a schematic diagram of a lane detection system 200 for identifying lane markers under several conditions. The lane detection system 200 includes a perception, planning and control module 202 suitable for detecting lane markers under favorable or good environmental conditions (e.g., good lighting, no rain or snow, etc.), planning a suitable trajectory based on the lane markers and controlling operation of the vehicle 10 and a detection enhancement module 204 that provides additional information that can be used for detecting lane markers when environmental conditions are unfavorable. A sensor, such as the camera 40, captures an image of the environment 206. The image can be a plurality of temporally spaced images such as in the form of a video file.

The perception, planning and control module 202 includes a perception system 208, a path planning module 210 and a control module 212. The image is sent from the camera 40 to the perception system 208. The perception system 208 determines the location of lane markings from the image. The perception system 208 can determine the colors of the pixels of the image and segment the image using pixel colors and determined from the shape of the separated pixel section, the location of the lane markings. The lane markings can be determined based on the color characteristics (e.g., red-green-blue (RGB)) of the pixels of the lane markings vs. the pixels of the surroundings in the image. In alternative embodiments, a neural network and/or machine learning algorithm can be used to determine the lane markings. The lane marking can be sent to the path planning module 210. The path planning module 210 generates a scene for display and shows the lane markings within the scene. The path planning module 210 can also plan a path through the environment based on the scene and the location of the lane markings. The path is sent to a control module 212 which determines instructions for operating the various actuators of the actuator system 32 to follow the path. The actuators can include, for example, steering, brakes, acceleration, etc.

The detection enhancement module 204 performs various algorithms for extracting road information unrelated to determining the lane markings via the color characteristics. For example, the extracted road information can be a road feature, including its shape and contour, a road segmentation of the image as well as the trajectories of nearby vehicles and/or nearby objects. Road segmentation refers to identifying pixels of the image that are road-related vs. those pixels that are not road-related. The information output by the detection enhancement module 204 can be used at the perception, planning and control module 202 to enhance the operation of the lane detection module. The detection enhancement module 204 can be invoked when the perception, planning and control module 202 determines that there is a lane loss situation in which it is unable to identify the lane markers. The detection enhancement module 204 can then perform enhanced lane detection and send its results back to the perception, planning and control module 202.

The detection enhancement module 204 includes a cyclic buffer 218 and operates a lane misdetection mitigation algorithm 216. The cyclic buffer 218 can be used to store the temporally spaced images and deliver them to the lane misdetection mitigation algorithm 216 in a usable order. The lane misdetection mitigation algorithm 216 extracts information from the image that is not directly related to the lane markings. Such information can include the location of the sides of the road or a shape of the road within the image. This information can be combined with the detections from the perception system 208 and provided to the path planning module 210. The path planning module 210 can plan a trajectory based on the lane markers generated using the extracted information. The generated lane markers can also be provided to a monitor 220. The monitor 220 can display the generated lane markers so that the driver knows what the vehicle is using to plan its trajectory and also to assist the driver if he or she takes over driving from the vehicle. The monitor 220 can be a head-up display, in various embodiments.

Figure 3:
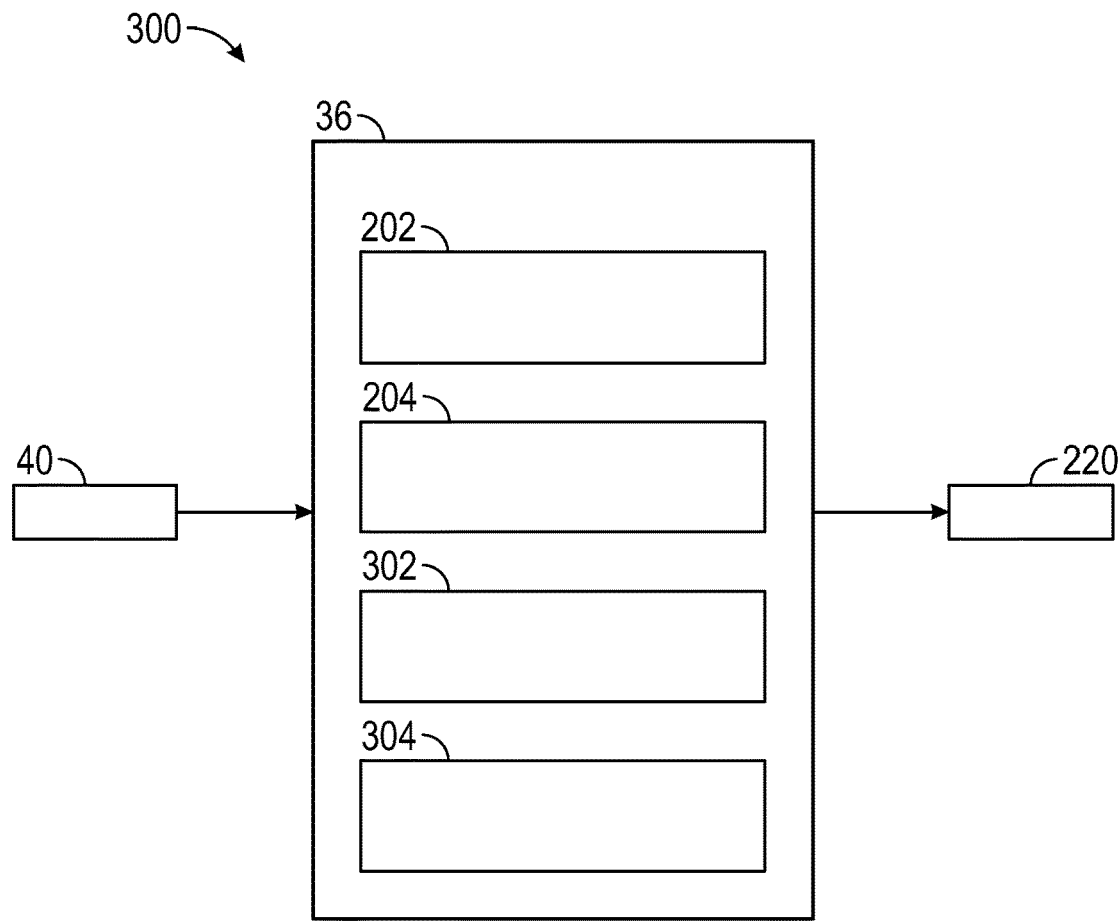
FIG. 3 shows a schematic representation of the components of the lane detection system operable at the processor of the vehicle to detect lane markings under difficult environmental conditions.

FIG. 3 shows a schematic representation 300 of the components of the lane detection system 200 operable at the processor 36 of the vehicle 10 to detect lane markings under difficult environmental conditions. The lane detection system 200 includes the camera 40, the processor 36, and the monitor 220. The image is sent from the camera 40 to the processor 36. The processor 36 operates one or more of the perception, planning and control module 202, the detection enhancement module 204, a switching module 302 and a comparison/arbitration module 304.

The switching module 302 sends the image to one or both of the perception, planning and control module 202 and the detection enhancement module 204. Under a favorable environmental condition, the switching module 302 directs the image to only the perception, planning and control module 202. Under less favorable conditions, the switching module can send the image to both the perception, planning and control module 202 and the detection enhancement module 204. Under the unfavorable conditions, a first result and a second result can be output. The first result is output by the perception, planning and control module 202 while the second result is output by a combination of the perception, planning and control module 202 and the detection enhancement module 204. Alternatively, the detection enhancement module 204 can generate the enhanced lane markers on its own.

The comparison/arbitration module 304 generates a final result based on the first result and the second result, as discussed herein. Additionally, the comparison/arbitration module 304 can output a confidence value of the final result. In one embodiment, the comparison/arbitration module 304 compares the first result and the second result and generates a warning signal when a difference between the first result and the second result is greater than a selected criterion. In another embodiment, the comparison/arbitration module selects between the first lane detection result and the section lane detection result based on a first confidence value generated for the first lane detection result and a second confidence value generated for the second lane detection result.

The monitor 220 displays the final lane detection result output from the processor 36 to be viewed by a driver of the autonomous vehicle. The driver can use the final lane detection result output when taking control of the vehicle. The monitor 220 can also display other information, such as the warning signal generated at the comparison/arbitration module 304, confidence values, etc.

Figure 4:
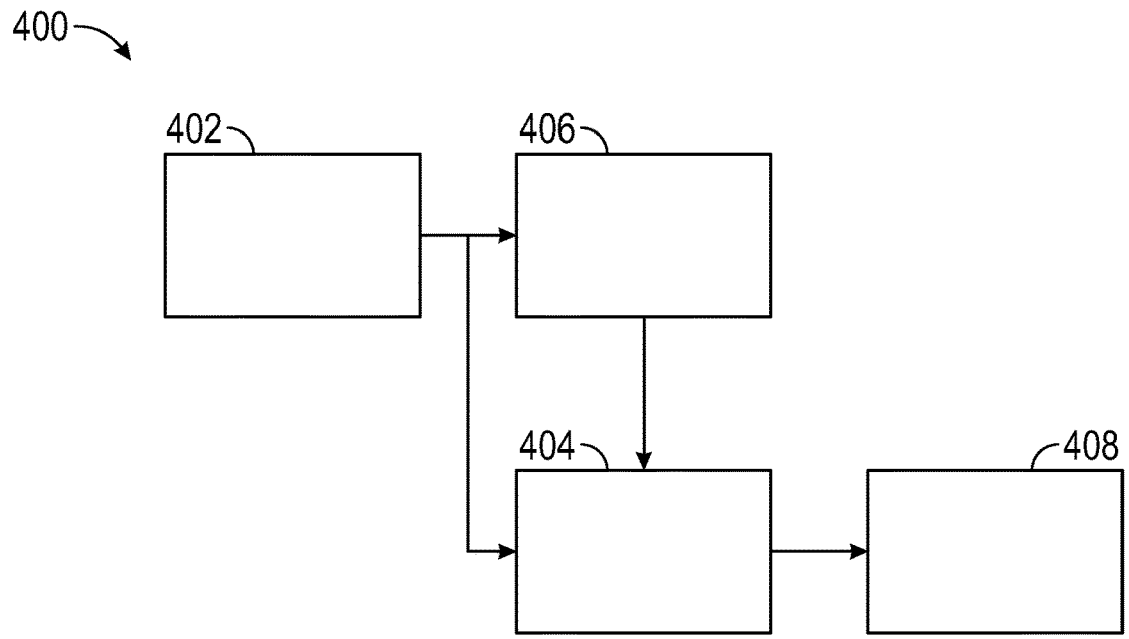
FIG. 4 shows a schematic diagram illustrating a first method for detecting lane markings.

FIG. 4 shows a schematic diagram 400 illustrating a first method for detecting lane markings. Image 402 is sent to both a lane detection algorithm 404 and an information extraction algorithm 406. The information extraction algorithm 406 performs road segmentation on the image 402 and locates objects in the image, such as nearby vehicles and their trajectories, and objects on the side of the road. The information from the information extraction algorithm 406 is sent to the lane detection algorithm 404. The lane detection algorithm 404 uses the extracted information to output lane detection results 408 including a set of marker points that are based on image-based lane detection methods using color characteristics of pixels in the image as well as the information obtained from the information extraction algorithm 406. This additional information can be used to determine or confirm a location for the lane markings within the roadway.

Figure 5:
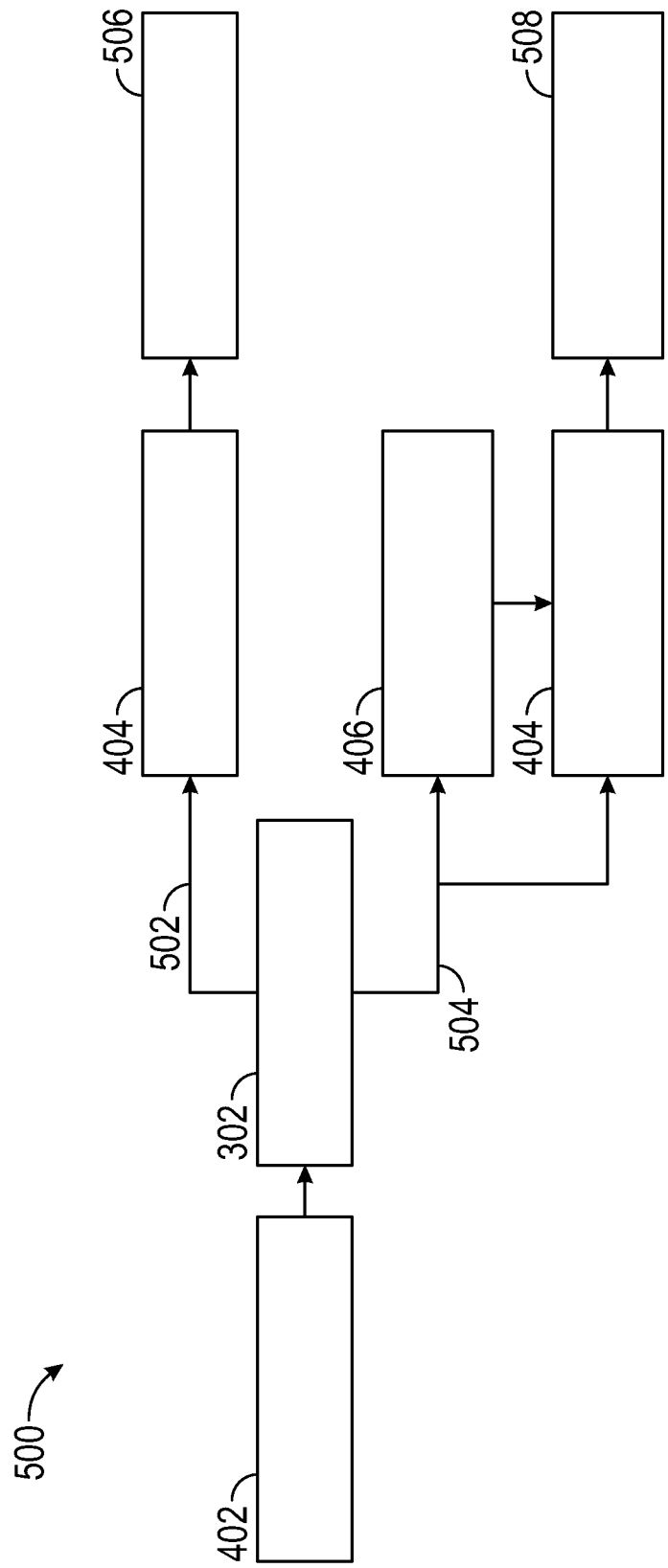
FIG. 5 shows a schematic diagram illustrating a second method for detecting lane markings.

FIG. 5 shows a schematic diagram 500 illustrating a second method for detecting lane markings. Image 402 is sent to the switching module 302. The switching module 302 selects whether to send the image along a first branch 502 or along a second branch 504. Along the first branch 502, the image 402 is processed using only the lane detection algorithm 404 (with no additional inputs) to generate first lane detection results 506 including a first set of marker points. Along the second branch 504, the image 402 is processed using the lane detection algorithm 404 with additional input generated at the information extraction algorithm 406 to generate lane detection results 508 including a second set of marker points, as described herein with respect to FIG. 4. Under good environmental conditions, the switching module 302 can select the first branch 502. When the lane detection results show signs of misdetection or when the environmental conditions are deteriorated, the switching module 302 will switch to sending the image along the second branch 504. A switching condition for selecting the first branch 502 or the second branch 504 can be based on the image resolution or other parameter, as well as a review of the lane detection results using only the lane detection algorithm 404. The image can be fed into a neural network to determine the environmental condition (e.g., raining, snowing) and determine a switching condition for the environmental condition.

Figure 6:
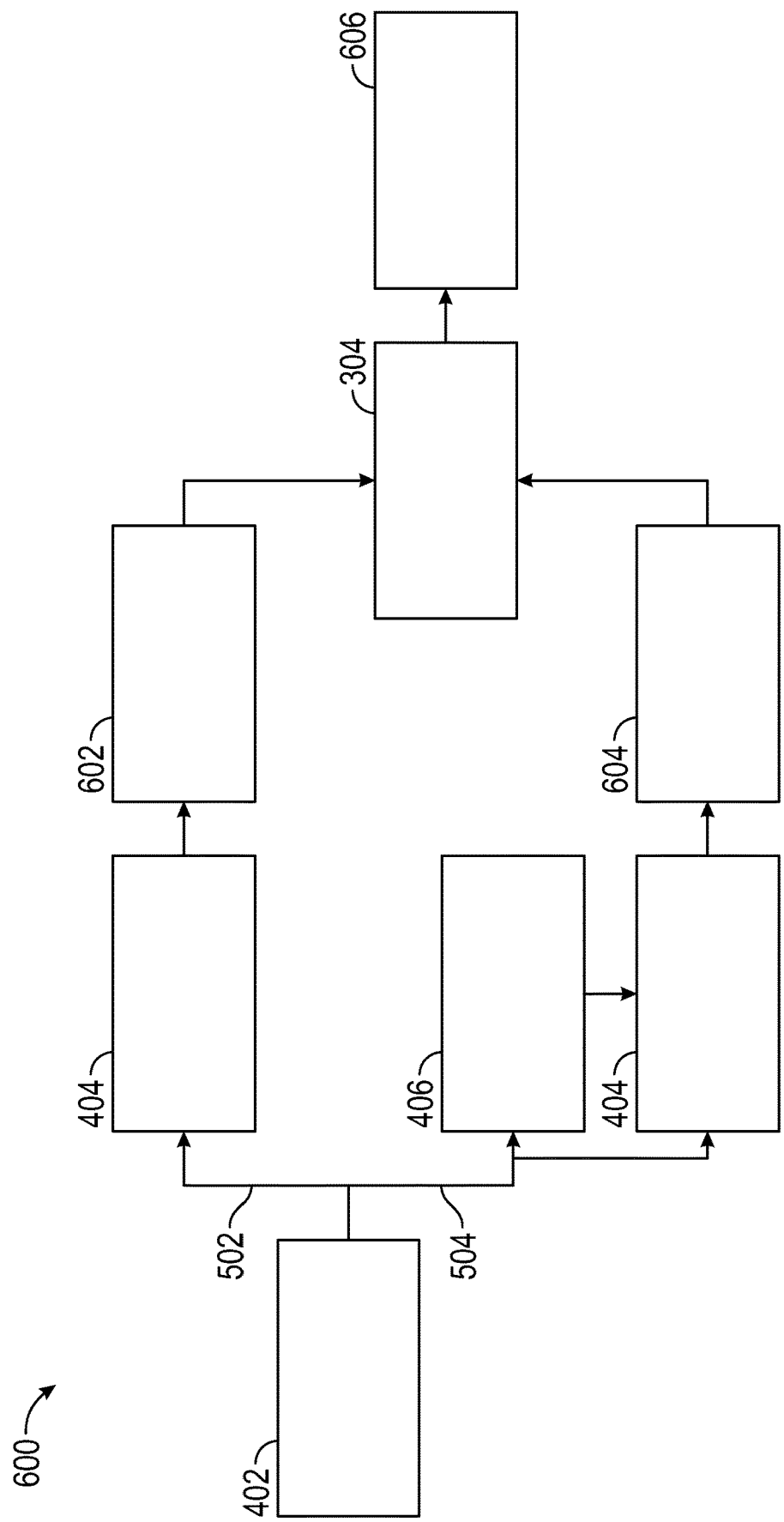
FIG. 6 shows a schematic diagram illustrating a third method by which the lane detection system detects lane markings.

FIG. 6 shows a schematic diagram 600 illustrating a third method by which the lane detection system 200 detects lane markings. Image 402 is sent along both a first branch 502 and a second branch 504. The first branch 502 includes processing the image 402 only at the lane detection algorithm 404 to generate first lane detection results 602. The second branch 504 includes processing the image 402 via both the lane detection algorithm 404 and the information extraction algorithm 406 to generate second lane detection results 604. The first lane detection results 602 and the second lane detection results 604 are both sent to the comparison/arbitration module 304 which compares the results. When the first lane detection results 602 and the second lane detection results 604 differ from each other by more than a selected criterion, a flag or warning is generated. The flag or warning can be sent to a warning system 606, which can generate an alert to the driver indicating lane detection issues, etc.

Figure 7:
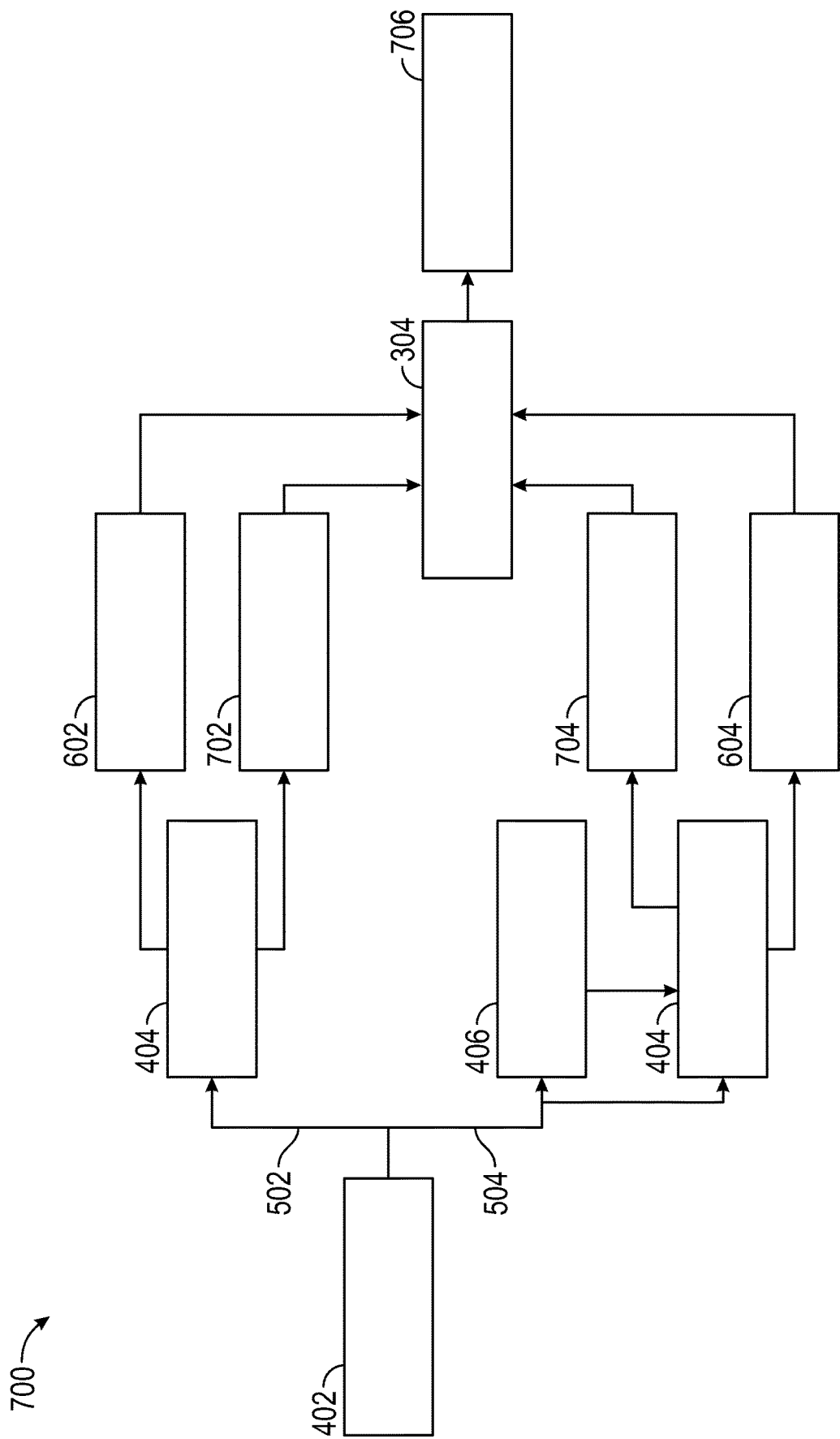
FIG. 7 shows a schematic diagram illustrating a fourth method by which the lane detection system detects lane markings.

FIG. 7 shows a schematic diagram 700 illustrating a fourth method by which the lane detection system 200 detects lane markings. Image 402 is sent along both a first branch 502 and a second branch 504. The first branch 502 includes processing the image 402 only at the lane detection algorithm 404 to generate first lane detection results 602 and a first confidence value 702 for the first lane detections results. The second branch 504 includes processing the image 402 via both the lane detection algorithm 404 and the information extraction algorithm 406 to generate second lane detection results 604 and a second confidence value 704 for the second lane detections results. The first lane detection results 602, first confidence value 702, second lane detection results 604 and second confidence value 704 are sent to the comparison/arbitration module 304.

The confidence value can be generated as output of a neural network that is used in generating the lane detection. Alternatively, the confidence value can be generated from contextual information. For example, an algorithm may be trained to perform better in certain scenarios or environmental conditions. The suitability of the algorithm can therefore be a factor in determining the confidence value of the results. The suitability of the algorithm can be determined using map data and/or weather conditions.

If the first lane detection results 602 and the second lane detection results 604 do not match, the comparison/arbitration module 304 can output a final lane detection result 706 having the highest confidence value. If both confidence values are low or are less than a confidence threshold, a flag or warning can be generated to indicate lane detection issues.

Figure 8:
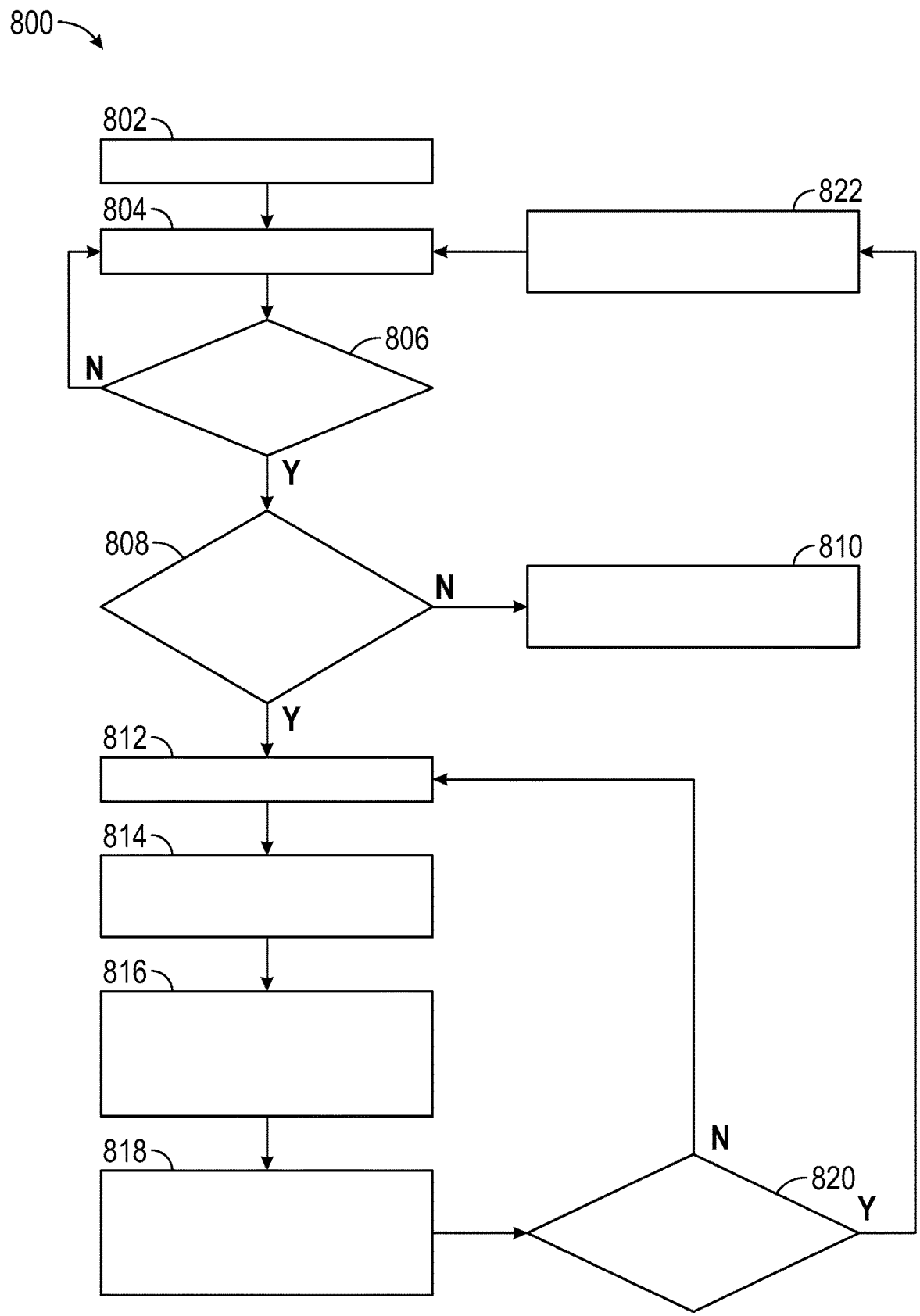
FIG. 8 shows a flowchart for a method of performing lane detection, in an illustrative embodiment.

FIG. 8 shows a flowchart 800 for a method of performing lane detection, in an illustrative embodiment. The method reduces a number of computations by waiting until lane markings misdetection occurs before adding computation steps for information extraction. The method may also constantly monitor the environment, check for challenging scenarios and engage the enhanced lane detection once these scenarios detected.

The method starts at box 802. In box 804, the system performance and operation of the lane detection algorithm is monitored for a selected wait time T, which can be a calibratable wait time. In box 806, the processor determines if there has been a loss of lane markings when only the lane detection algorithm is being used. If there is no loss of lane markings, the method returns to box 804 for the wait time T. If, however, there is a loss of lane markings, the method proceeds to box 808. In box 808, the processor determines whether it can address a challenging scenario, such as snow, rain, etc., that has caused the loss of lane markings. If the processor determines that it cannot address the challenging scenario using the methods disclosed herein, the method proceeds to box 810, in which the driver is prompted to take over control of the vehicle. If, however, the processor determines that it can address the challenging scenario, the method proceeds to box 812. In box 812, information is extracted from the image. In box 814, the lane detection algorithm is performed using the additional inputs from the information extracted from the image.

In box 816, the lane marking is displayed to the driver at the monitor 220. In box 818, the lane markings are sent to other components of the vehicle that support automated driving of the vehicle. In box 820, the processor checks to see if the challenging scenario is still in effect. If the challenging scenario is still in effect, the method proceeds back to box 812. If, however, the challenging scenario is no longer in effect, the method proceed to box 822. In box 822, the processor switches back to normal lane detection methods (i.e., without information extraction). The method the proceeds from box 822 to box 804.

Figure 9:
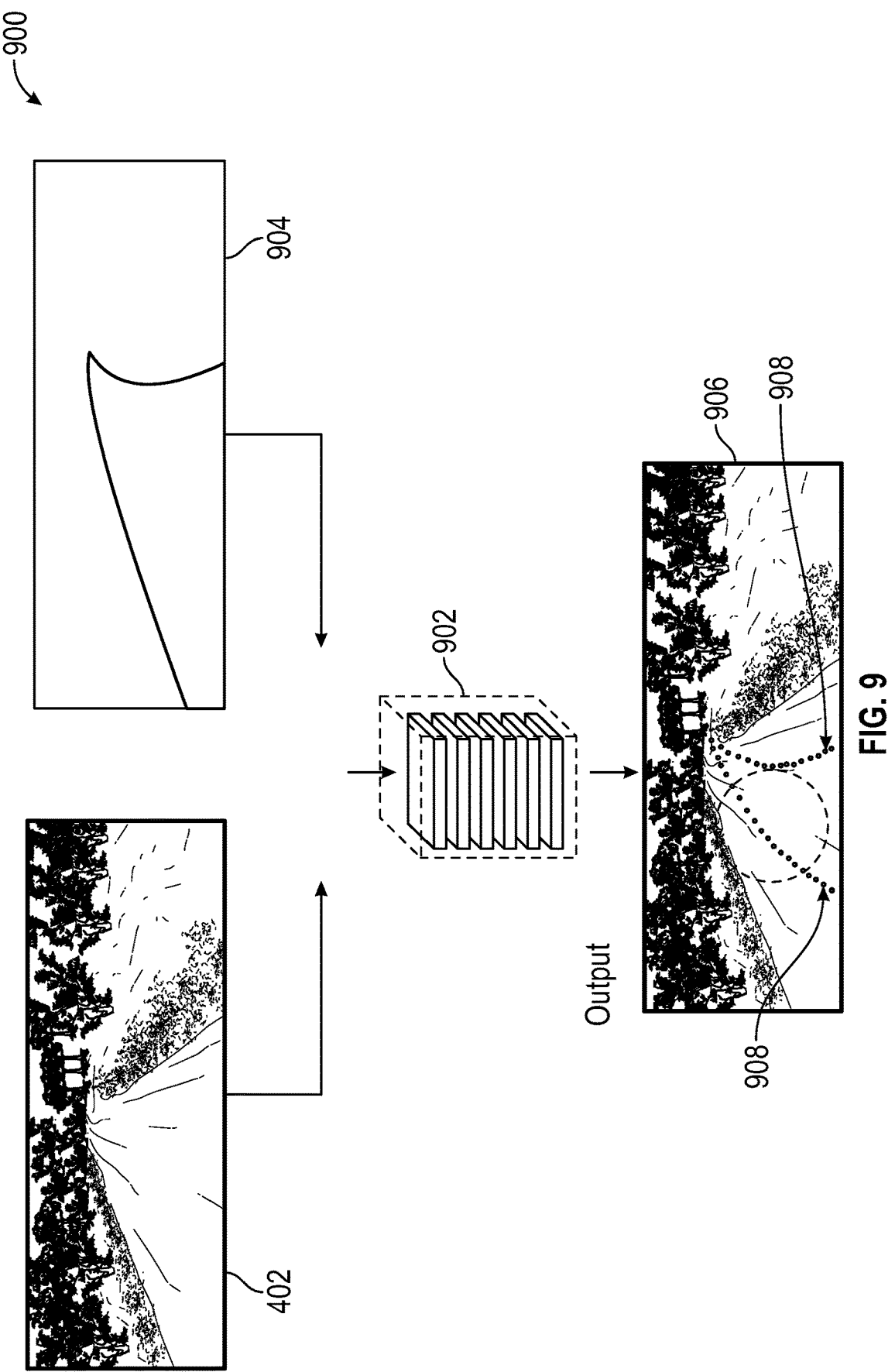
FIG. 9 shows a schematic diagram illustrating operation of a neural network to determining lane markings, in a first embodiment.

FIG. 9 shows a schematic diagram 900 illustrating operation of a neural network 902 to determining lane markings, in a first embodiment. The neural network 902 includes a plurality of network layers. In a normal mode of operation, (i.e., using only the lane detection algorithm 404), the neural network 902 receives the image 402 and determines (from the RGB coding of the pixels of the image) the presence and location of lane markings. In an enhanced mode of operation, the extracted information 904 obtained via the information extraction algorithm 406 is provided into the neural network 902 alongside the image 402. The extracted information 904 is provided along a separate channel in the neural network. The neural network 902 outputs an image 906 and places the lane markings 908 within the image 906 for viewing by the driver.

Figure 10:
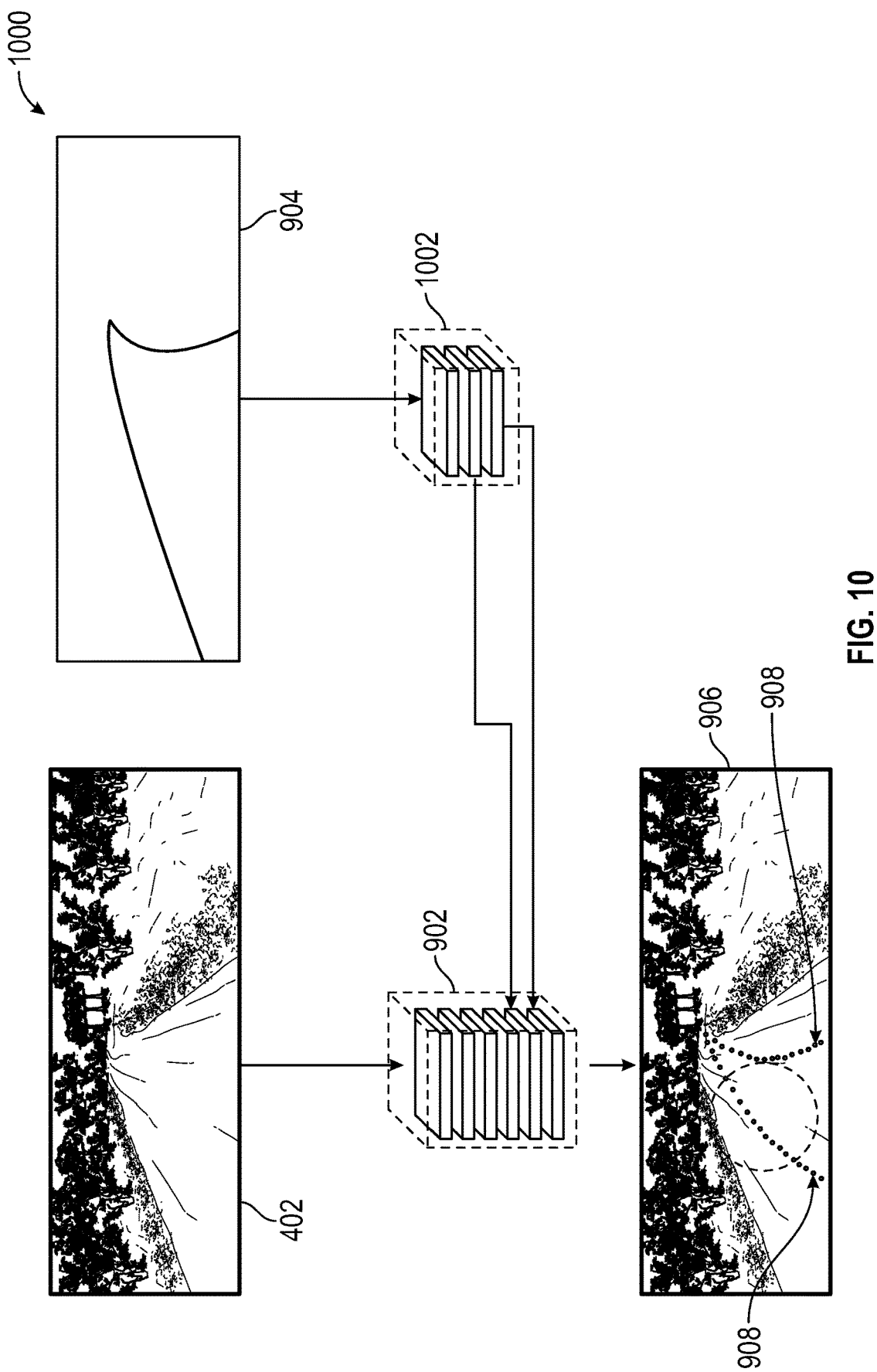
FIG. 10 shows a schematic diagram illustrating operation of the neural network, in a second embodiment.

FIG. 10 shows a schematic diagram 1000 illustrating operation of the neural network 902, in a second embodiment. The image 402 is entered into the neural network 902. The extracted information is entered into a features extraction neural network 1002. Features can be pulled from a selected layer of the features extraction neural network 1002 and introduced into a corresponding layer of the neural network 902. The neural network 902 outputs the image 906 with the lane markings 908.

Figure 11:
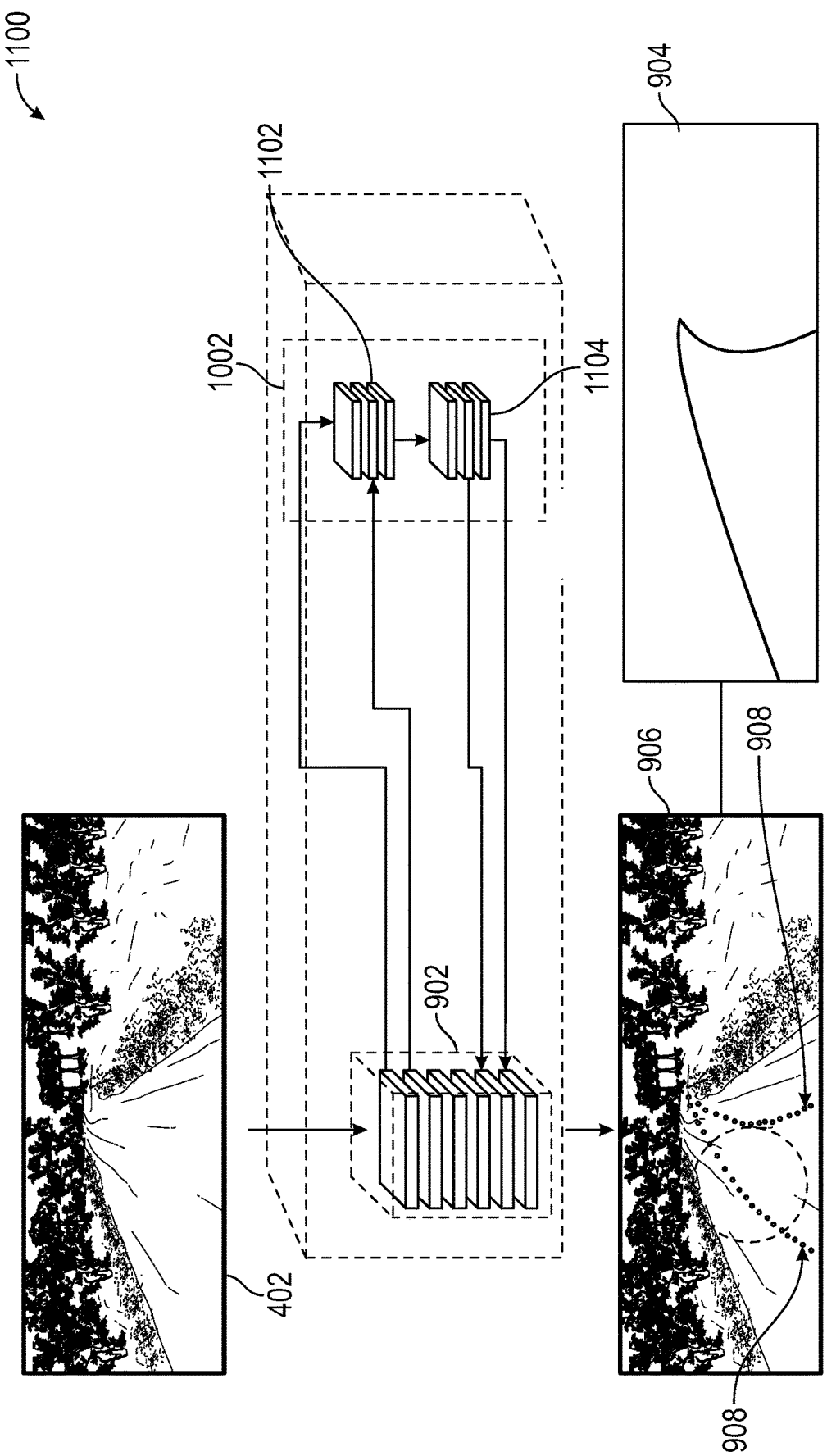
FIG. 11 show a schematic diagram illustrating operation of the neural network, in a third embodiment.

FIG. 11 show a schematic diagram 1100 illustrating operation of the neural network 902, in a third embodiment. The image 402 is entered into the neural network 902. Data is pulled from a selected layer of the neural network 902 and introduced into a corresponding layer 1102 of the features extraction neural network 1002. The corresponding layer 1102 outputs the extracted information 904. Features can be pulled from a subsequent layer 1104 of the features extraction neural network 1004 and introduced back into a corresponding layer of the neural network 902. The neural network 902 outputs the image 906 with lane markings 908.

Figure 12:
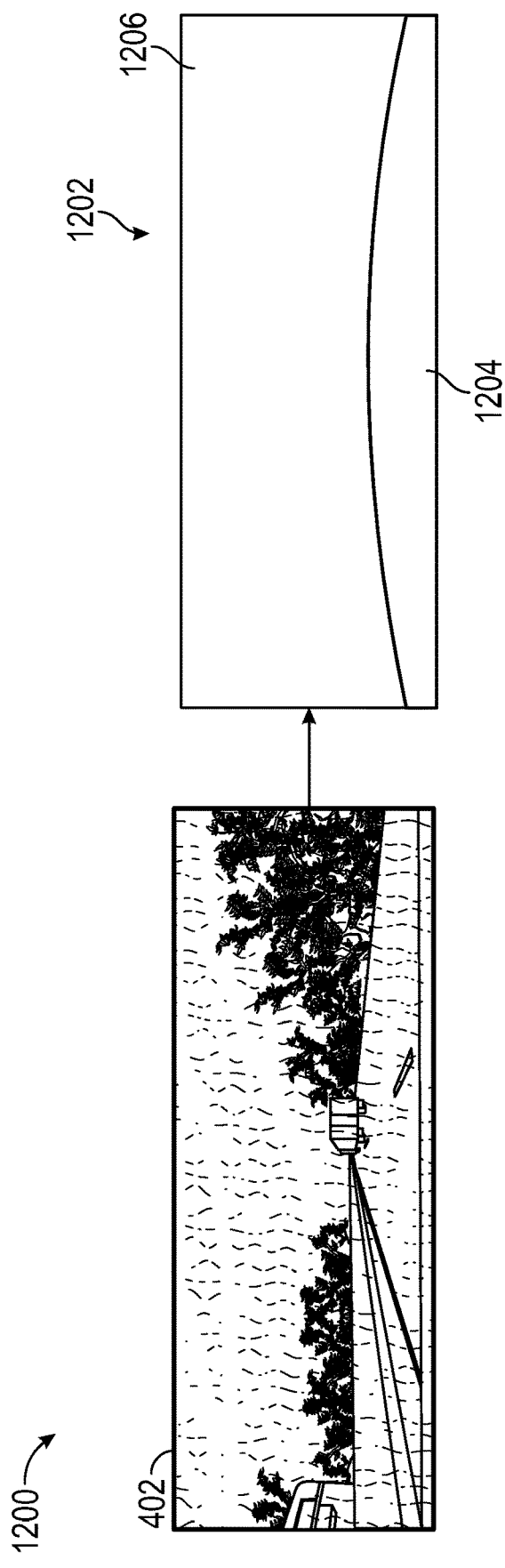
FIG. 12 illustrates a road segmentation operation performed at the detection enhancement module.

FIG. 12 illustrates a road segmentation operation performed at the detection enhancement module 204. The image 402 is input to the detection enhancement module 204, which separates the image 402 into a road segmentation data set 1202. A first region 1204 of the road segmentation data set 1202 includes the road and its contour. A second region 1206 includes non-road pixels.

Figure 13:
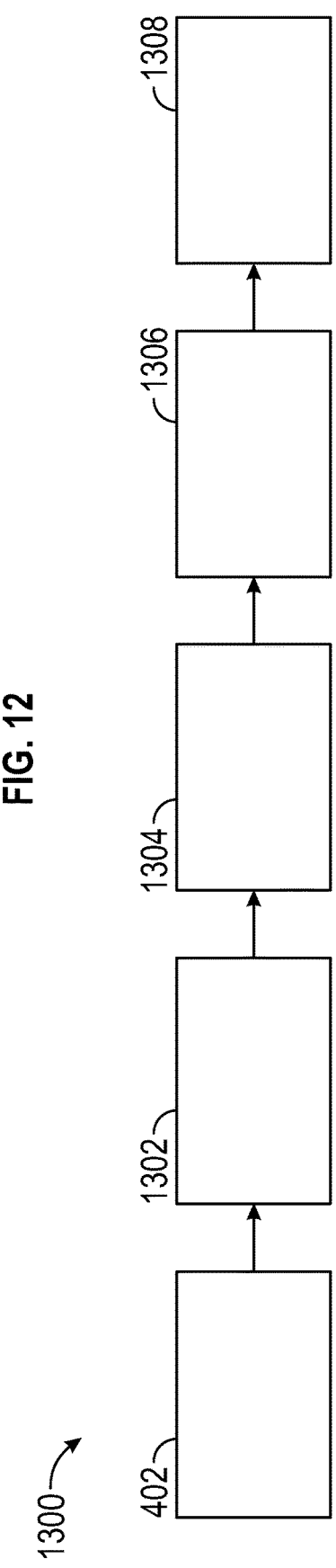
FIG. 13 shows a flowchart for a method of extracting trajectories of nearby vehicles for use in lane detection enhancement.

FIG. 13 shows a flowchart 1300 for a method of extracting trajectories of nearby vehicles for use in lane detection enhancement. The image 402 (or video) is input to an object detection module 1302 which detects nearby vehicles and objects in the image or video. An object tracking module 1304 then tracks the nearby vehicles and objects through multiple frames of the video. A compensation module 1306 compensates for the tracking of motion of the vehicle 10. The trajectory tracking module 1308 generates the trajectories for the nearby vehicle, which can be used to generate enhanced lane markings.

Figure 14:
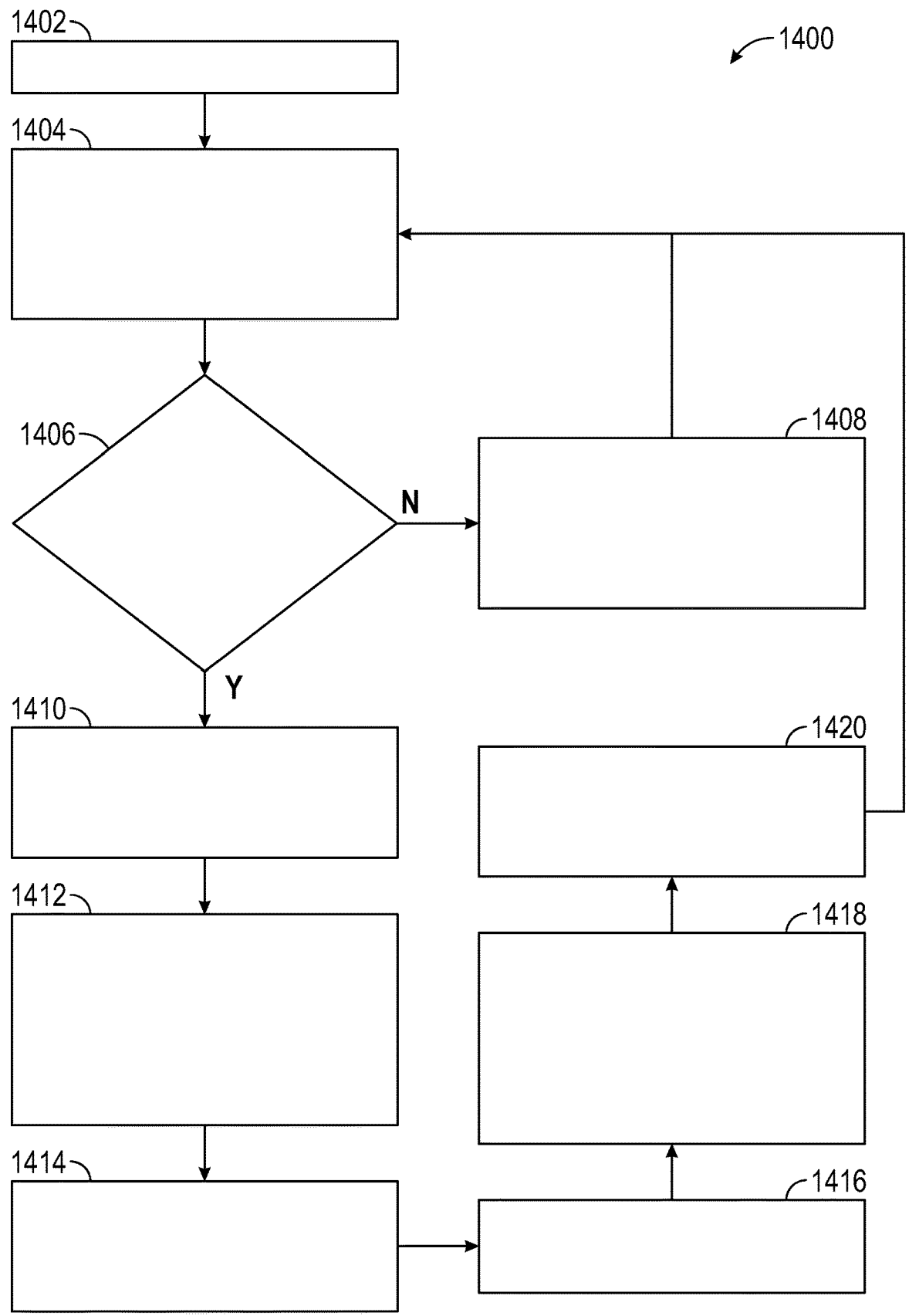
FIG. 14 shows a flowchart of a method for determining a trajectory of a nearby vehicle or road agent from an image or video.

FIG. 14 shows a flowchart 1400 of a method for determining a trajectory of a nearby vehicle or road agent from an image or video. The method starts in box 1402. In box 1404, a nearby vehicle or road agent is located within and image and coordinates are assigned to it in a coordinate frame of the image. In box 1406, a tracker algorithm determines if the nearby vehicle is also present in a previous frame of the video. Otherwise, (i.e., if this is a new nearby vehicle), the method proceed to box 1408. In box 1408, a new detected vehicle is generated and its coordinates stored for use with respect to a next frame in the video.

Returning to box 1406, if the nearby vehicle is already present, the method proceeds to box 1410. In box 1410, the trajectory coordinates for the vehicle are retrieved from the previous frame(s) or image(s). In box 1412, the trajectory coordinates for the previous image(s) are transformed to a coordinate frame at a bird's eye view (BEV) perspective. In box 1414, the BEV coordinates are updated (i.e., in, straight line driving the BEV coordinates are moved closer to the host vehicle to compensate for the speed of the vehicle). In box 1416, the updated coordinates are transformed back into the coordinates system for the image. In box 1418, the updated and transformed coordinates and the coordinates on the current frame are concatenated and drawn onto the current frame as the trajectory coordinates. In box 1420, the trajectory coordinates are stored for use in the next frame of the video. The method then proceeds back to box 1404.

Figure 15A:
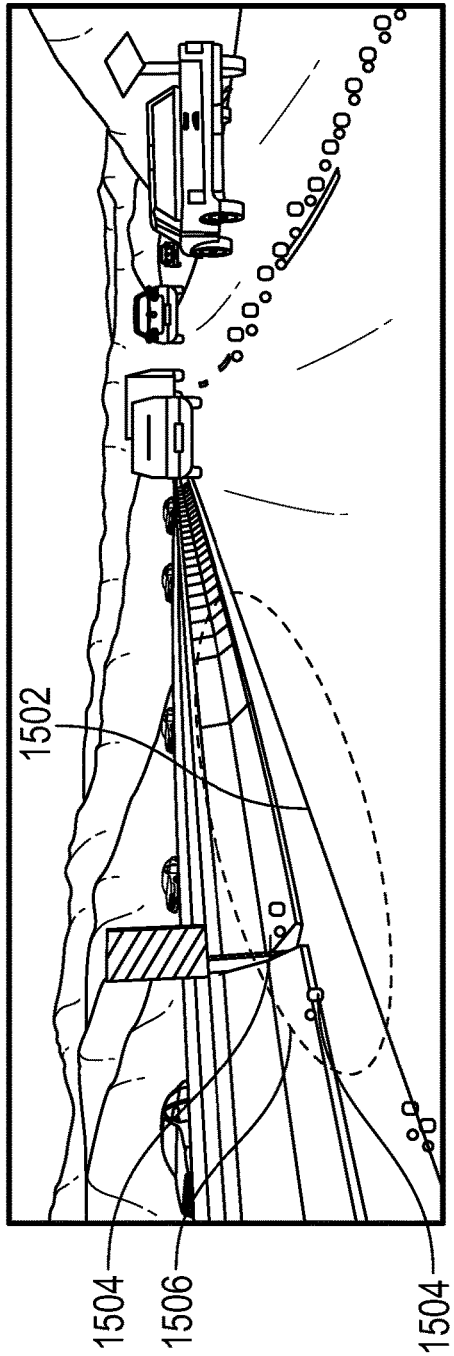
FIGS. 15A and 15B illustrate the effect of using the information extraction module to improve operation of the lane detection module.
Figure 15B:
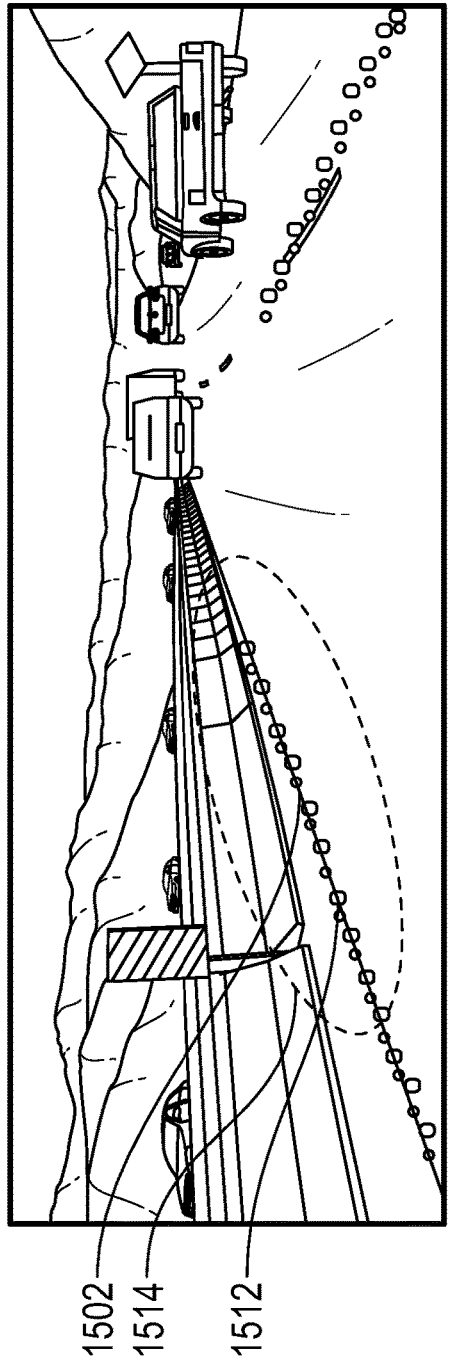

FIGS. 15A and 15B illustrate the effect of using the detection enhancement module 204 to improve operation of the perception, planning and control module 202. FIG. 15A shows a first image 1500 of a roadway with lane markers 1502. The first image 1500 also displays marker points 1504 generated using only the perception, planning and control module 202. Circle 1506 highlights the marker points 1504. As shown in FIG. 15A, the marker points 1504 are not aligned with the lane markers 1502.

FIG. 15B shows a second image 1510 with corrected marker points 1512 generated using the perception, planning and control module 202 and additional road segmentation data provided by the detection enhancement module 204. Circle 1514 highlights the lane markers 1502 along the roadway and the corrected marker points 1512 generated using the additional road segmentation data. The corrected marker points 1512 are aligned with the lane markers 1502 to a greater degrees than the marker points 1504 shown in FIG. 15A.

FIGS. 16A and 16B illustrate the effects of road segmentation data on improving lane detection results. FIG. 16A shows a first image 1600 displaying lane detection results obtained without the use of road segmentation data. The first image 1600 shows a snow-covering road with marker points 1602. Circle 1604 highlights a kink in the marker points 1602, which can cause problems at the vehicle. FIG. 16B shows a second image 1610 with corrected marker points 1612 obtained using road segmentation data. Circle 1614 highlights the same region as circle 1604 in FIG. 16A but shows the corrected marker points 1612 without the kink shown in FIG. 16A.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of navigating a vehicle, comprising:
   obtaining, at a camera on the vehicle, an image of a road upon which the vehicle is moving;
   determining a first set of lane markers by segmenting the image using pixel colors;
   determining a first confidence value for the first set of lane markers;
   determining a feature from the image that includes a shape of the road;
   determining a second set of lane markers based on the shape of the road in the image;
   determining a second confidence value for the second set of lane markers; and
   generating a warning signal when a difference between the first confidence value and the second confidence value is greater than a selected criterion.

2. The method of claim 1, wherein the feature further comprises a road segmentation information.

3. The method of claim 2, wherein the feature further comprises a trajectory of a road agent on the road.

4. The method of claim 1, further comprising displaying at a monitor the set of lane markers to a driver of the vehicle.

5. The method of claim 1 further comprising at least one of: (i) sending the image to a lane detection module to determine the first set of lane markers using pixel colors; and (ii) sending the image to both the lane detection module to determine the first set of lane markers using pixel colors and to an information extraction module to determine the second set of lane markers based on the shape of the road.

6. The method of claim 5, further comprising selecting a final set of marker points from a first set of marker points and a second set of marker points.

7. The method of claim 6, further comprising selecting the final set of marker points using the first confidence value and the second confidence value.

8. A system for navigating a vehicle, comprising:
   a camera for obtaining an image of a road upon which the vehicle is moving;
   a processor configured to:
      determine a first set of lane markers by segmenting the image using pixel colors;
      determine a first confidence value for the first set of lane markers;
      determine a feature from the image that includes a shape of the road;
      determine a second set of lane markers based on the shape of the road in the image;
      determine a second confidence value for the second set of lane markers; and generate a warning signal when a difference between the first confidence value and the second confidence value is greater than a selected criterion.

9. The system of claim 8, wherein the feature further comprises a road segmentation information.

10. The system of claim 9, wherein the feature further comprises a trajectory of a road agent on the road.

11. The system of claim 8, wherein the processor is further configured to display the set of lane markers to a driver of the vehicle at a monitor.

12. The system of claim 8, wherein the processor is further configured to perform at least one of: (i) send the image to a lane detection module to determine the first set of lane markers using pixel colors; and (ii) send the image to both the lane detection module to determine the first set of lane markers using pixel colors and to an information extraction module to determine the second set of lane markers based on the shape of the road.

13. The system of claim 12, wherein the processor is further configured to select a final set of marker points from a first set of marker points and a second set of marker points.

14. The system of claim 13, wherein the processor is further configured to select the final set of marker points using the first confidence value and the second confidence value.

15. A vehicle, comprising:
a camera for obtaining an image of a road upon which the vehicle is moving;
a processor configured to:
determine a first set of lane markers by segmenting the image using pixel colors;
determine a first confidence value for the first set of lane markers;
determine a feature from the image that includes a shape of the road;
determine a second set of lane markers based on the shape of the road in the image;
determine a second confidence value for the second set of lane markers; and
generate a warning signal when a difference between the first confidence value and the second confidence value is greater than a selected criterion.

16. The vehicle of claim 15, wherein the feature further comprises at least one of: (i) a road segmentation information; and (ii) a trajectory of a road agent on the road.

17. The vehicle of claim 15, wherein the processor is further configured to display the set of lane markers to a driver of the vehicle at a monitor.

18. The vehicle of claim 15, wherein the processor is further configured to perform at least one of: (i) sending the image to a lane detection module to determine the first set of lane markers using pixel colors; and (ii) sending the image to both the lane detection module to determine the first set of lane markers using pixel colors and to and an information extraction module to determine the second set of lane markers based on the shape of the road.

19. The vehicle of claim 18, wherein the processor is further configured to select a final set of marker points from a first set of marker points and a second set of marker points.

20. The vehicle of claim 19, wherein the processor is further configured to select the final set of marker points using the first confidence value and the second confidence value.

* * * * *